Oct. 30, 1962 R. L. BERGESON 3,060,742
CONDITION SENSING APPARATUS
Filed June 8, 1959 2 Sheets-Sheet 1
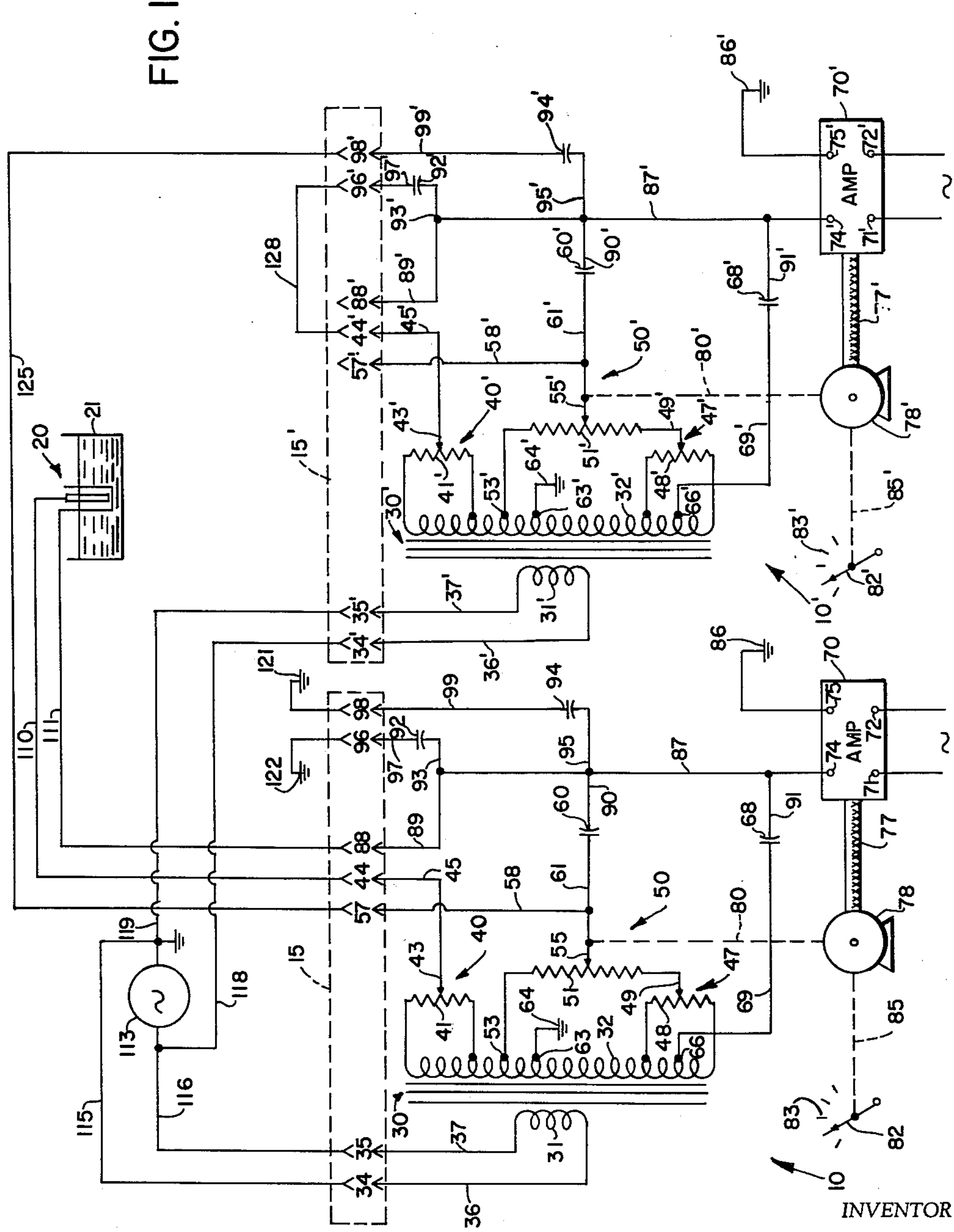
INVENTOR
RAYMOND L. BERGESON
BY [signature]
ATTORNEY Oct. 30, 1962 R. L. BERGESON 3,060,742
CONDITION SENSING APPARATUS
Filed June 8, 1959 2 Sheets-Sheet 2
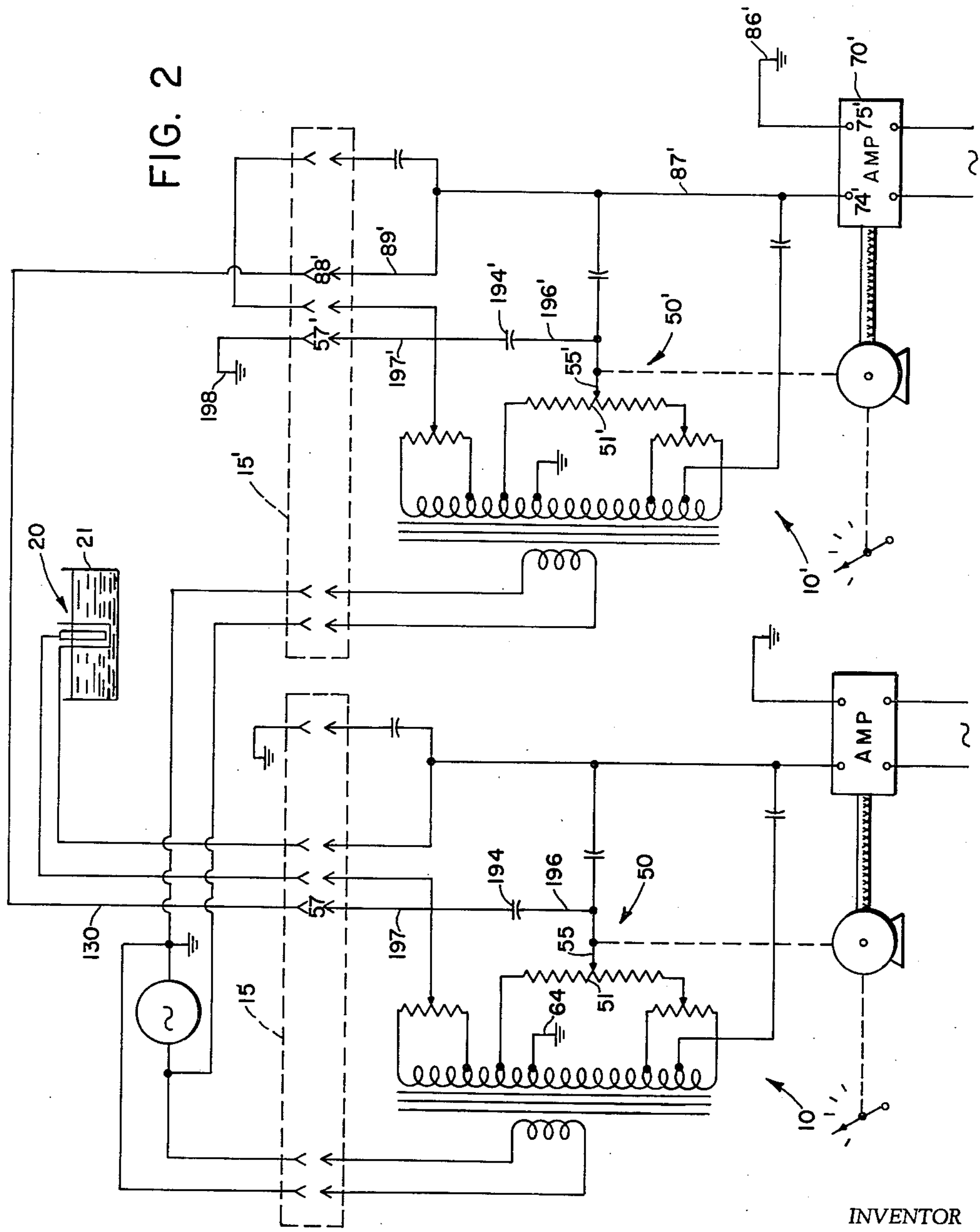
INVENTOR
RAYMOND L. BERGESON
BY [signature]
ATTORNEY United States Patent Office 3,060,742

Patented Oct. 30, 1962

3,060,742
CONDITION SENSING APPARATUS

Raymond L. Bergeson, St. Paul, Minn., assignor to Minneapolis-Honeywell Regulator Company, Minneapolis, Minn., a corporation of Delaware Filed June 8, 1959, Ser. No. 818,956
9 Claims. (Cl. 73—304)

The present invention is concerned with condition sensing apparatus and more particularly with capacitive type condition sensing bridges wherein a plurality of indications are to be given at positions remote from one another.

Capacitive bridge circuits have long been used in the art to sense conditions such as the level of fluid in a container. Such a circuit may be found in the J. W. Bancroft Patent No. 2,793,529, which is assigned to the assignee of the present invention. Briefly such circuits use a sensing capacitor in a rebalanceable three wire bridge circuit to obtain an indication of the condition sensed. The sensing capacitor is normally situated in the condition to be sensed and has a basic or air capacitance component and a component which is due to the condition. For example, if the condition being sensed is fluid level, the sensor has a basic or empty capacitance when there is no fluid between the plates. When fluid which has a dielectric constant greater than air rises between the plates, there is an increase in capacitance over and above the basic capacitance. This increase may be called the added component or the component due to the condition.

When used in a three wire bridge, the sensing capacitor operates with a source of voltage to produce a signal the magnitude of which may be considered to have two components, one due to the empty capacitance of the sensor and the other due to the added capacitance. A three wire bridge as used herein may be described as a circuit having a sensing branch which includes a source of voltage and connections by which the sensing capacitor may be inserted in series with the source of voltage to produce a signal having a first phase and a magnitude dependent upon the basic capacitance and the capacitance due to the condition, having a reference branch including a source of voltage and a capacitor connected in series to produce a signal of phase opposite to the first phase and of magnitude sufficient to null the component of the signal in the sensing branch due to the basic capacitance, and having a rebalance branch including a source of voltage of variable magnitude in series with a capacitor to produce a signal of phase opposite to the first phase and of magnitude sufficient to null the component of the signal in the sensing branch due to the condition. The signals are all connected together and at balance, all signals are nulled out. Since the reference branch nulls out the basic capacitance component, the magnitude of the voltage from the variable voltage source at balance is a function of the condition being sensed.

Normally, an amplifier or other voltage responsive device is connected to all three branches of the three wire bridge and operates to position a reversible motor whenever the bridge is not balanced. The motor operates to vary the magnitude of the voltage source in the rebalance branch in such a direction as to cause the signal in the rebalance branch to reduce the signal from the sensing branch until a balance condition is again established. The motor movement necessary to re-establish balance is a function of the voltage in the rebalance branch and is used as an indication of the condition being sensed.

Frequently, it is desirable to indicate the same condition at two stations remote from each other and obviously the single motor cannot be used to operate a primary and a repeater indicator which are thus separated. A repeater circuit is often provided which utilizes a voltage created in the primary indicator. Usually this is done by an auxilliary potentiometer located in the primary indicator which has a source of voltage connected across the winding and which has a movable tap positioned by the motor. The voltage on the tap is then indicative of the condition being sensed and is presented to a repeater indicator. In the repeater circuit, an amplifier receives the transmitted voltage and causes a motor to vary an oppositely phased voltage source for rebalance. Here, as in the primary circuit, the amount of motor movement necessary to cause rebalance is indicative of the condition being sensed and hence remote indication is obtained.

One disadvantage of such a system is that it requires an extra potentiometer and any error in the transmitting potentiometer is transferred to the repeater indicator as an undetected erroneous voltage. The present invention overcomes this problem by utilizing the voltage on the rebalance potentiometer, which voltage must be correct or the primary indicator will not be balanced. Hence little or no error in voltage can be presented to the repeater indicator.

It has been found desirable to make the repeater indicator and the primary indicator interchangeable so that a spare indicator may be provided to replace either the primary or the repeater and also to simplify production of the indicators. Since the above described repeater circuit only contains an input to the amplifier and a rebalance branch it could not be used as the primary indicator since there is no provision for a sensing capacitor and no reference branch to null the signal due to basic capacitance of the sensor. If the repeater circuit were given a reference branch then it could no longer be used as a repeater since there is no signal component in the repeater for the reference branch to null out. The present invention provides two indicators either of which may be used in the primary or repeater location.

It is therefore an object of the present invention to provide primary and repeater circuitry which may be used interchangeably.

This and other objects will become clear upon inspection of the specification claims and drawings in which:

FIGURE 1 is a schematic representation of a preferred embodiment of the present invention, and;

FIGURE 2 is a schematic representation of an alternate embodiment of the present invention.

Referring to FIGURE 1 a primary indicator 10 and a repeater indicator 10' are shown each having the same circuitry so that they may be interchanged if desired. The primary indicator 10 may be located at a first indicating position and plugged into a standard connector shown in FIGURE 1 as a dashed line box 15 and the repeater indicator 10' may be located at a second indicating position and plugged into a standard connector shown as dashed line box 15'. Consistent with the herein disclosed invention the repeater indicator 10' could be plugged into the terminal box 15 and the primary indicator 10 plugged into the terminal box 15' in which case both would operate in a normal manner.

A capacitive fluid level sensor or probe 20 is shown mounted in a container of fluid 21 so that as fluid rises and falls in container 21 it also fills the space between the electrodes of the capacitive probe 20. When the container 21 is empty the capacitance of the probe 20 is referred to as the basic or empty capacitance of the probe and when the tank 21 is partly or completely filled the increase capacitance of the probe 20 is referred to as the added capacitance due to the fluid.

The primary indicator 10 and the repeater indicator 10' will now be described. Since they have identical circuitry, the reference numerals for the repeater 10' will correspond to the reference numerals for the primary 10 but will be primed.

The primary indicator 10 has a transformer 30 having a primary winding 31 and a secondary winding 32. The primary winding 31 is connected between terminals 34 and 35 of connector 15 by conductors 36 and 37. A first calibration potentiometer 40 has a winding 41 connected across the upper portion of transformer secondary 32 and has a movable wiper 43 which is connected to a terminal 44 of connector 15 by a conductor 45. A second calibration potentiometer 47 has a winding 48 connected across the lower portion of transformer secondary 32 and has a movable wiper 49. A rebalance potentiometer 50 has a winding 51 connected between wiper 49 of potentiometer 47 and a tap 53 located intermediate the ends of transformer secondary 32. A movable wiper 55 of potentiometer 50 is connected to a terminal 57 of connector 15 by a conductor 58 and also to one electrode of a rebalance capacitor 60 by a conductor 61. Intermediate the ends of transformer secondary 32, a tap 63 is connected to ground or reference potential at 64. A tap 66 near the lower end of secondary 32 is connected to one electrode of a reference capacitor 68 by a conductor 69. It is seen that the voltage on wiper 55 of rebalance potentiometer 50 and on conductor 69 is of opposite phase to the voltage on wiper 43 of calibration potentiometer 40, since they are on opposite sides of the grounded tap 63.

An amplifier 70 energized from a source of voltage applied to terminals 71 and 72 has a pair of input terminals 74 and 75 and an output shown as cable 77 to which a reversible motor 78 is connected. Motor 78 is controlled by the output of amplifier 70 and is connected to position wiper 55 of potentiometer 50 by means of a mechanical connection shown as dashed line 80 and to position an indicator pointer 82 on a scale 83 by means of a mechanical connection shown as dashed line 85.

Input terminal 75 is connected to ground or reference potential at 86 and input terminal 74 is connected to a common conductor 87. Common conductor 87 is connected to a terminal 88 of connector 15 by conductor 89, to the other electrode of rebalance capacitor 60 by conductor 90, to the other electrode of reference capacitor 68 by conductor 91, to one electrode of an "empty" capacitor 92 by conductor 93 and to one electrode of an "added" capacitor 94 by a conductor 95. The other electrode of "empty" capacitor 92 is connected to a terminal 96 of connector 15 by a conductor 97 and the other electrode of "added" capacitor 94 is connected to a terminal 98 of connector 15 by a conductor 99.

As stated the repeater indicator 10′ is identical to primary indicator 10 and the circuitry therein has reference numerals corresponding to the reference numerals for primary indicator 10 only they are primed. No further description of the circuitry of repeater indicator 10′ need be given.

The circuitry of the connection harness external to the indicators will now be described. The electrodes of the capacitive probe 20 are connected to terminals 44 and 88 of connector 15 by conductors 110 and 111 so that the capacitance of the probe may be used in the primary indicator as will be described. A source of voltage 113 is connected between terminals 34 and 35 of connector 15 by conductors 115 and 116 and is connected in reverse manner between terminals 34′ and 35′ of connector 15′ by means of conductors 118 and 119. The phase of the voltage on terminals 34 and 35 is opposite that of the voltage on terminals 34′ and 35′ so that the primary indicator 10 is operating in all respects at opposite phase to the repeater indicator 10′ for reasons to be hereinafter shown. A pair of ground or reference potential connections 121 and 122 are connected to terminals 96 and 98 of connector 15. A conductor 125 is connected between terminals 57 of connector 15 and terminal 98′ of connector 15′ for purposes of introducing a signal indicative of fluid level from the primary indicator 10 to the repeater indicator 10′ as will be described further. Finally, a conductor 128 is connected between terminals 44′ and 96′ of connector 15′. These connections external to the indicators 10 and 10′ make it possible to use the indicators interchangeably.

*Operation of Figure 1*

The primary indicator 10 includes three circuits which may be traced to the input of amplifier 70. A first of these circuits may be traced from wiper 43 of calibration potentiometer 40 through conductor 45, terminal 44 of connector 15, conductor 110, sensor 20, conductor 111, terminal 88 of connector 15, conductor 89, and common conductor 87, to terminal 74 of amplifier 70. The circuit is completed from terminal 75 of amplifier 70 to the tap 63 of transformer secondary 32 through ground connections 86 and 64. This circuit provides a signal to amplifier 70 of a first phase and of magnitude which may be considered as having two components; one due to the empty capacitance of the sensor 20 and one due to the added capacitance brought about by the presence of fluid between the electrodes of sensor 20.

A second circuit to the input of amplifier 70 may be traced from tap 66 near the lower portion of transformer secondary 32 through conductor 69, reference capacitor 68, conductor 91 and common conductor 87 to the input terminal 74 of amplifier 70. This circuit is also completed from terminal 75 of amplifier 70 to the tap 63 of transformer secondary 32 through ground connections 86 and 64. The size of capacitor 68 is so chosen that the signal therethrough, which is of opposite phase to the signal through sensor 20, is of magnitude equal to the magnitude of the component of the signal through sensor 20 due to the empty capacitance thereof. The signal through capacitor 68 nulls that portion of the signal through sensor 20 due to its empty capacitance and leaves a signal to amplifier 70 which is indicative of the level of the fluid between the electrodes of sensor 20.

A third circuit may be traced to the input of amplifier 70 from wiper 55 of rebalance potentiometer 50 through conductor 61, rebalance capacitor 60, conductor 90 and common conductor 87 to the input terminal 74 of amplifier 70. This circuit is also completed from terminal 75 of amplifier 70 to the tap 63 of transformer secondary 32 through ground connections 86 and 64. This circuit presents a signal to amplifier 70 which is of phase opposite to the signal through the sensor 20 and of magnitude dependent upon the position of wiper 55 on the winding 51 of rebalance potentiometer 50. If the magnitude of the signal in the third circuit is equal to the magnitude of the component of the signal through the sensor 20 due to the added capacitance then the three circuits present no signal to the amplifier 70 and the three wire bridge is said to be balanced. If after the bridge is balanced, the fluid in container 21 rises or falls, then the added component of the signal through the sensor 20 changes. Amplifier 70 then receives a signal of phase dependent upon whether the fluid rose or fell and operates motor 78 to change the position of wiper 55 to re-establish the condition of balance. The angular position of motor 78 and the position of wiper 55 are then indicative of the quantity of fluid in container 21. Likewise the voltage on wiper 55 being dependent upon the position of wiper 55 is also indicative of the quantity of fluid in container 21. The quantity may be displayed by indicator pointer 82 moving along the graduations of the dial 83 which are calibrated in units of fluid quantity.

The repeater indicator 10′ operates in the same way, that is, there are three circuits to the amplifier 70′ which null each other out at balance at which time the position of motor 78′ and wiper 55′ are indicative of the quantity of fluid in container 21. However, since the sensor 20 is not included in the repeater circuitry, a signal of magnitude equal to the signal through the sensor 20 must be supplied another way. This signal is derived in repeater indicator 10' by two separate circuits. A first circuit may be traced from wiper 43' of calibration potentiometer 40' through conductor 45', terminal 44' of connector 15', conductor 128, terminal 96' of connector 15', conductor 97', "empty" capacitor 92', conductor 93' and common conductor 87' to terminal 74' of amplifier 70'. This circuit is completed from terminal 75' of amplifier 70' to the tap 63' of transformer secondary 32' through ground connections 86' and 64'. Capacitor 92' is substantially equal in values to the empty capacitance of sensor 20 so that a signal is presented to amplifier 70' of a phase opposite to the signal through the sensor 20 and of magnitude substantially equal the component of the signal through the sensor 20 due to the empty capacitance thereof. The phase of this signal is opposite to the signal through the sensor 20 since the primary 31' of transformer 30' in the repeater indicator 10' is connected to the voltage source 113 in a manner opposite to the connection of primary winding 31 of transformer 30 in the primary indicator 10. The purpose of this phase reversal will become apparent hereinafter.

A second circuit to the input of amplifier 70' may be traced from the wiper 55 of rebalance potentiometer 50 in primary indicator 10 through conductor 58, terminal 57 of connector 15, conductor 125, terminal 98' of connector 15', conductor 99', "added" capacitor 94', conductor 95' and common conductor 87' to terminal 74' of amplifier 70'. This circuit is completed from terminal 75' of amplifier 70' to the tap 63 of transformer secondary 32 through ground connections 86' and 64. "Added" capacitor 94' is substantially equal to the rebalance capacitor 60 in primary indicator 10 so that a signal is presented to amplifier 70' of phase opposite the signal through the sensor 20 and of magnitude substantially equal to the added component of the signal through sensor 20. These two circuits then present a signal to amplifier 70' in the repeater indicator 10' substantially equal to the whole signal through the sensor 20. It is seen, that by placing capacitors 92 and 92' in the indicators that a substitute signal equal to the empty component of signal through the sensor 20 is supplied in the repeater indicator and that by placing capacitors 94 and 94' in the indicators a substitute signal equal to the added component of the signal through the sensor 20 is provided from the primary indicator to the repeater indicator. The latter signal is indicative of the level of fluid in container 21.

The remainder of the repeater circuit operates like the primary, that is, capacitor 68' provides a signal to amplifier 70' which nulls the substitute signal through capacitor 92' and capacitor 60' provides a signal to amplifier 70' which opposes the substitute signal through capacitor 94' which is indicative of fluid level. Any remaining signal causes motor 78' to position wiper 55' at such a position that the signal through capacitor 60' equals the substitute fluid level signal through capacitor 94' at which time the system is balanced and the angular position of motor 78', the position of wiper 55' and the indicator pointer 82' are indicative of the level of fluid in container 21. It is seen that since the signal from the primary indicator's wiper 55 through the repeater indicator's capacitor 94' is of phase opposite to the signal through sensor 20 that the signal from the repeater indicator's wiper 55' through capacitor 60' must be of opposite phase in order to achieve balance. This is the reason why the primary winding 31' of the repeater indicator 10' is connected to the source 113 in reverse manner to the primary winding 31 of the primary indicator 10. Of course, the motors 78 and 78' must have line windings which are reversed with respect to each other in the same manner so that each motor will drive the correct direction to achieve rebalance.

Often the distance between the primary and the repeater indicator is large and there is considerable possibility that the conductor 125 which connects the two indicators could be shorted out to the ground or reference potential. If this happened to the circuit of FIGURE 1, it would cause malfunction of both the repeater indicator 10' and primary indicator 10. This consideration may or may not be important depending upon the circumstances under which the two indicators are used but to overcome the problem the circuit of FIGURE 2 may be used in which provisions are made that in case the conductor connecting the two indicators is shorted to ground the primary indicator will continue to function correctly.

Referring to FIGURE 2, it is seen that the circuitry is substantially the same as in FIGURE 1. The parts of the circuitry which are identical to those in FIGURE 1 have been given the same reference numerals and since the operation of the circuits are the same as in FIGURE 1, only those parts which have been changed will be described.

The circuit which provides a signal to the repeater indicator 10' equal to the component of the signal through sensor 20 due to the added capacitance thereof may now be traced as follows: from wiper 55 of rebalance potentiometer 50 in primary indicator 10 through a conductor 196, an "added" capacitor 194, a conductor 197, terminal 57 of connector 15, a conductor 130, terminal 88' of connector 15', conductor 89' and common conductor 87' to input terminal 74' of amplifier 70'. The circuit is completed from terminal 75' of amplifier 70' through ground connections 86' and 64. It is seen that conductor 130 which may be shielded if necessary is connected to terminal 88' on connector 15' which terminal was not used in FIGURE 1 and that the "added" capacitor for the repeater circuit has now been placed in the primary indicator 10 with reference numeral 194. "Added" capacitor 194 is substantially the same size as "added" capacitor 94' in FIGURE 1 and in the same way is used to provide a signal to the repeater indicator 10' substantially equal to the component of the signal through sensor 20 which is indicative of the added capacitance thereof. It is seen that if the conductor 130 is now grounded, the primary indicator 10 will continue to operate since the impedance of the "added" capacitance 194 is sufficient to block appreciable current flow from wiper 55 to the ground formed by conductor 130. In fact capacitor 194' in repeater indicator 10' is connected to ground at 198 from terminal 57' of connector 15' since the added capacitor 194' is not used in the repeater circuit. The operation of the primary indicator 10 of FIGURE 2 is the same as in FIGURE 1 and the operation of the repeater indicator 10' in FIGURE 2 is the same as in FIGURE 1 except that the "added" signal is through capacitor 194 located in the primary indicator 10 rather than capacitor 94' located in repeater indicator 10'.

It is seen that apparatus has been provided to indicate the value of a condition at two or more remote positions by means of indicators which may be interchanged with each other. Many obvious alternations to the circuitry shown will occur to those skilled in the art. I therefore wish only to be limited by the following claims.

I claim:

1. A primary fluid level measuring device and a repeater fluid level measuring device, each being interchangeable with the other, comprising: first and second transformers, one located in each device and each having a secondary with a first terminal, a second terminal and a tap intermediate the first and second terminals connected to a point of reference potential; an amplifier in each device having a first input terminal, a second input terminal connected to the point of reference potential and each supplying an output; a motor in each device connected to the output of the amplifier in that device to be controlled thereby; a first capacitor in each device connected between the second terminal of the transformer secondary and the first input terminal of the amplifier in that device; a potentiometer in each device having a winding connected between the tap and the second terminal of the transformer secondary in that device and each having a movable wiper; a second capacitor in each device connected between the movable wiper and the first input terminal of the amplifier in that device; a third capacitor in each device having one terminal connected to the movable wiper in that device; a fourth capacitor in each device having a first terminal connected to the first input terminal of the amplifier of that device; a fluid level sensing capacitor located external to said devices and having a capacitance due to an empty tank component and a component representative of the level of fluid being measured; means connecting said fluid level sensing capacitor between the first input terminal of the amplifier of said primary device and the first terminal of the transformer secondary in said primary device to produce a signal to the amplifier having a component due to the empty capacitance and a component due to the fluid level; means connecting the other terminal of the fourth capacitor in said repeater device to the first terminal of the transformer secondary in said repeater device, the magnitude of the fourth capacitor being such as to present a signal to the amplifier of the repeater device indicative of the empty tank component of said fluid level sensing capacitor; the magnitude of the first capacitor being such as to present a signal to the amplifier of each device sufficient to null the signal indicative of the component due to the empty capacitance; means connecting the motor of said primary device to the movable wiper in that device to position the wiper so that a signal is presented to the amplifier through the second capacitor suitable to null the signal indicative of the component due to fluid level; means connecting the other terminal of the third capacitor in said primary device to the first terminal of the amplifier in said repeater device so that a signal is presented thereto indicative of the fluid level as sensed by said primary device; and means connecting the motor of said repeater device to the movable wiper in that device.

2. First and second condition sensing indicators each operable as a primary or as a repeater comprising: a three wire bridge having sensing, reference and rebalance branches in each indicator; a voltage responsive device in each indicator having an input connected to the three branches and having an output operable to vary the signal in the rebalance branch; capacitive condition sensing means having an empty capacitance component and a capacitance component due to the condition being sensed; an empty reference capacitor; means partly external to the indicators connecting the sensing means in the sensing branch of the bridge of the indicator used as a primary and connecting the empty reference capacitor in the sensing branch of the bridge of the indicator used as a repeater; and means including a capacitor connecting the rebalance branch of the bridge of the indicator used as a primary to the input of the voltage responsive device in the indicator used as a repeater.

3. A repeater indicator for use in a capactive fluid level sensing system whereby an electrical signal from a primary indicator indicative of the amount of fluid being sensed is used to produce a remote indication of the amount of fluid comprising: a first source of voltage; a second source of voltage; a third source of voltage of variable magnitude; an amplifier having an input and an output; means in the repeater indicator connecting the signal from the primary indicator to the input of said amplifier to produce a signal of a first phase and of magnitude indicative of the amount of fluid being sensed; first capactive means in the repeater indicator connecting said first voltage source to the input of said amplifier to produce a signal of the first phase and of predetermined magnitude; second capacitive means in the repeater indicator connecting said second voltage source to the input of said amplifier to produce a signal of phase opposite to the first phase and of magnitude sufficient to nullify the signal from said first voltage source; third capactive means connecting said third voltage source to the input of said amplifier to produce a signal of phase opposite to the first phase to reduce the signal from the primary indicator; motor means connected to the output of said amplifier and operable to control the magnitude of the signal from said third voltage source until the signal therefrom is sufficient to nullify the signal from the primary indicator; and means connected to said motor means indicating the position thereof and hence the amount of fluid being sensed.

4. Apparatus of the class described comprising in combination: primary indicator and a repeater indicator each having a first source of voltage of a first phase, a second source of voltage of a phase opposite to the first phase, a third source of voltage of a phase opposite to the first phase and of variable magnitude, an amplifier having an input and an output, a motor connected to the output of said amplifier to be controlled thereby, means connecting the motor to control the magnitude of said third voltage source, a first capacitor connected between said second source of voltage and the input of said amplifier, a second capacitor connected between said third source of voltage and the input of said amplifier, a third, and a fourth capacitor having one plate connected to the input of said amplifier; a capactive fluid level sensing element; and circuitry connecting said capacitive sensing element between said first source of voltage and the input of said amplifier of said primary indicator, connecting the third source of voltage of said primary indicator to the other plate of the third capacitor in said repeater indicator, connecting the first source of voltage in the repeater indicator to the other plate of the fourth capacitor of the repeater indicator and reversing the phase of the first, second and third voltage sources in the repeater indicator with respect to the phases of the first, second and third voltage sources in the primary indicator.

5. A primary and a repeater indicator each having identical bridge circuitry which comprises: a first branch adapted to include a capacitive fluid level sensing element for producing a current of a first phase and of magnitude indicative of the empty tank basic capacitance of the element and the height of fluid between the plates thereof; a second branch which includes a fixed capacitor for producing a current of phase opposite to the first phase and of magnitude equal to the empty tank basic capacitance of the element; a third branch including a variable source of voltage and a capacitor for producing a current of phase opposite to the first phase and of magnitude equal to the magnitude of the current in said first branch due to the height of fluid between the plates of the element; an amplifier having an input connected to receive the sum of the currents from the three branches; a motor connected to an output of the amplifier and connected to control the magnitude of the voltage of the variable voltage source in said a third branch; a first capacitor having one plate connected to the variable voltage source; a second capacitor of size substantially equal to the basic empty capacitance of the element having one plate connected to the input of the amplifier; and connecting circuitry which places the element in the first branch of the primary indicator, connects the other plate of the first capacitor of the primary indicator to the input of the amplifier of the repeater indicator, connects the second capacitor to form a part of the first branch of the repeater indicator, and reverses the phase of the currents in the first, second and third branches of the repeater indicator 180° with respect to those in the primary indicator.

6. Apparatus of the class described comprising, in combination: a repeater indicator having a first source of alternating voltage of a first phase, a second source of alternating voltage of a phase opposite to the first phase, a third source of alternating voltage of phase opposite the first phase and of variable magnitude, an amplifier having an input and an output, motor means connected to the output of said amplifier and operable to vary the magnitude of said third voltage source; a primary indicator having an electrical output of said first phase and of magnitude indicative of the condition being indicated; means connecting the output of said primary indicator to the input of said amplifier; means connecting said first voltage source to the input of said amplifier to present a signal of the first phase and of predetermined magnitude thereto; means connecting said second voltage source to the input of said amplifier to present an electrical signal of phase opposite the first phase and of magnitude sufficient to nullify the signal from said first voltage source; means connecting said third voltage source to the input of said amplifier to present a signal of phase opposite said first phase and of magnitude sufficient to nullify the signal from said primary indicator; and means connected to said motor means indicating the position thereof.

7. Apparatus of the class described comprising, in combination: a primary indicator having an output supplying an electrical signal of a first phase and of magnitude indicative of a condition; a repeater indicator having a first source of voltage of the first phase, a second source of voltage of phase opposite the first phase, a third source of voltage of phase opposite the first phase and of variable magnitude; voltage responsive means having an input and a movable output; means connecting the movable output to control the magnitude of said third source of voltage; a first impedance connected between said second source of voltage and the input of said voltage responsive means to supply a signal of phase opposite the first phase and of a predetermined magnitude to said voltage responsive means; a second impedance connected between said third source of voltage and the input of said voltage responsive means to supply a signal of phase opposite the first phase and of magnitude dependent upon the magnitude of said third source of voltage; a third impedance having a first terminal connected to the input of said voltage responsive means and a second terminal; and circuitry partly external to said indicators connecting the output of the primary indicator to the input of said voltage responsive device and connecting said first source of voltage to the second terminal of said third impedance to supply a signal of said first phase and of said predetermined magnitude to said voltage responsive device.

8. An interchangeable indicator assembly capable of being used as either a primary or repeater device in an indicator system comprising, in combination: a first voltage source having a first phase; a second voltage source having a phase opposite the first phase; a third voltage source having a phase opposite the first phase and having a variable magnitude; voltage responsive means having an input and supplying a movable output; means connecting the movable output to control the magnitude of said third voltage source; a first substantially fixed capacitance means attached to said assembly and connected between said second voltage source and the input of said voltage responsive means; a second substantially fixed capacitance means attached to said assembly and connected between said third voltage source and the input of said voltage responsive means; a plurality of connector terminals attached to said assembly for facilitating the use of the assembly as either the primary or the repeater indicator and for connecting the assembly to an external wiring system; means connecting said first voltage source to a first of said connector terminals; means connecting the input of said voltage responsive means to a second of said connector terminals; a third substantially fixed capacitance means attached to said assembly and connected between the input of said voltage responsive means and a third of said connector terminals; and a fourth substantially fixed capacitance means attached to said assembly and connected between the input of said voltage responsive means and a fourth of said connector terminals.

9. A primary-repeater indicator system comprising, in combination: a primary indicator supplying a first signal of a first phase and of magnitude indicative of the value of a condition; and a repeater indicator including, means supplying a second signal of phase opposite the first phase and of variable magnitude, means supplying a third signal of the first phase and of a predetermined fixed magnitude, means supplying a fourth signal of phase opposite the first phase and of the predetermined fixed magnitude, signal responsive means connected to receive said first, second, third and fourth signals, and means connected to said signal responsive means and to said first named means to vary the magnitude of the second signal until it equals the magnitude of the first signal.

References Cited in the file of this patent

UNITED STATES PATENTS

| | | |
|---|---|---|
| 2,639,411 | Schafer | May 19, 1953 |
| 2,706,799 | Howe et al. | Apr. 19, 1955 |
| 2,760,372 | Storm | Aug. 28, 1956 |
| 2,767,584 | Franzel et al. | Oct. 23, 1956 |
| 2,769,338 | Hermanson | Nov. 6, 1956 |
| 2,797,284 | Brooke | June 25, 1957 |
| 2,833,147 | Di Franco | May 6, 1958 |
| 2,866,337 | Minneman et al. | Dec. 30, 1958 |
| 2,872,811 | Bergeson | Feb. 10, 1959 |
| 2,874,570 | Bergeson | Feb. 24, 1959 |

FOREIGN PATENTS

| | | |
|---|---|---|
| 1,144,844 | France | Apr. 29, 1957 |
| 1,011,633 | Germany | July 4, 1957 |
| 1,149,158 | France | July 8, 1957 |